United States Patent
Mohammad et al.

(10) Patent No.: US 11,814,309 B1
(45) Date of Patent: Nov. 14, 2023

(54) MULTISTAGE DESALINATION PROCESS WITH CARBON DIOXIDE CAPTURE

(71) Applicant: UNITED ARAB EMIRATES UNIVERSTIY, Al Ain (AE)

(72) Inventors: Ameera Mohammad, Al Ain (AE); Ali H. Al-Marzouqi, Al Ain (AE); Aya A. Mourad, Al Ain (AE); Muftah El-Naas, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 18/118,551

(22) Filed: Mar. 7, 2023

(51) Int. Cl.
| | | |
|---|---|---|
| C02F 9/00 | (2023.01) | |
| C01D 7/18 | (2006.01) | |
| C01F 11/46 | (2006.01) | |
| B01D 53/14 | (2006.01) | |
| C01F 5/20 | (2006.01) | |
| C02F 1/52 | (2023.01) | |
| C02F 1/00 | (2023.01) | |
| C02F 1/20 | (2023.01) | |
| C02F 1/463 | (2023.01) | |
| C02F 101/10 | (2006.01) | |
| C02F 103/08 | (2006.01) | |

(52) U.S. Cl.
CPC ............ *C02F 9/00* (2013.01); *B01D 53/1475* (2013.01); *C01D 7/18* (2013.01); *C01F 5/20* (2013.01); *C01F 11/46* (2013.01); *B01D 2252/1035* (2013.01); *B01D 2257/504* (2013.01); *C02F 1/004* (2013.01); *C02F 1/20* (2013.01); *C02F 1/463* (2013.01); *C02F 1/5236* (2013.01); *C02F 2101/10* (2013.01); *C02F 2103/08* (2013.01); *C02F 2301/08* (2013.01); *C02F 2303/18* (2013.01)

(58) Field of Classification Search
CPC .... C02F 9/00; C02F 1/004; C02F 1/20; C02F 1/463; C02F 1/5236; C02F 2101/10; C02F 2103/08; C02F 2301/08; C02F 2303/18; B01D 53/1475; B01D 2252/1035; B01D 2257/504; C01D 7/18; C01F 5/20; C01F 11/46
USPC ........................................ 423/164
See application file for complete search history.

(56) References Cited

U.S. PATENT DOCUMENTS

| | | |
|---|---|---|
| 6,180,012 B1 | 1/2001 | Rongved |
| 7,309,440 B2 | 12/2007 | Børseth |
| 9,474,998 B2 | 10/2016 | Koo et al. |
| 10,118,843 B2 | 11/2018 | El-Naas |

FOREIGN PATENT DOCUMENTS

| | | |
|---|---|---|
| KR | 101955889 B1 | 3/2019 |

OTHER PUBLICATIONS

Mohammad et al. "Optimization of a solvay-based approach for CO2 capture." Int. J. Chem. Eng. Appl 7 (2016): 230-234.
El-Naas et al. "A new process for the capture of CO2 and reduction of water salinity." Desalination 411 (2017): 69-75.
Mustafa et al. "Simultaneous treatment of reject brine and capture of carbon dioxide: A comprehensive review." Desalination 483 (2020): 114386.
Lee et al. "Recovery of Alkaline Earth Metals from Desalination Brine for Carbon Capture and Sodium Removal." Water 13.23 (2021): 3463.
Mourad et al. "CO2 capture and ions removal through reaction with potassium hydroxide in desalination reject brine: Statistical optimization." Chemical Engineering and Processing—Process Intensification 170 (2022): 108722.

*Primary Examiner* — Edward M Johnson
(74) *Attorney, Agent, or Firm* — Nath, Goldberg & Meyer; Richard C. Litman

(57) ABSTRACT

A system and method of desalinating a brine stream are provided. The multistage desalination process with carbon dioxide capture recovers valuable products where the reject brine is passed through seven stages. In each stage, a specific metal ion is recovered. In stage 1, a ~100% recovery of magnesium ions as magnesium hydroxide solid was obtained by chemical reaction with ammonia solution. In stage 2, $Na^+$ reduction, as sodium bicarbonate, and $CO_2$ uptake was achieved. In stage 3, electrocoagulation (EC) was used to recover sulfate ions as pure calcium sulfate solid and to regenerate $NH_3$ as ammonium hydroxide. In stage 4, CaO was added to the treated brine. In stage 5, more recovery of $NaHCO_3$ was attained by adding ammonium bicarbonate, while in stage 6, the treated brine mixture was passed through another modified Solvay process. In stage 7, EC was again used to recover $CaCl_2$ solution and $NH_3$ compounds.

20 Claims, 9 Drawing Sheets

MULTISTAGE DESALINATION PROCESS WITH CARBON DIOXIDE CAPTURE

BACKGROUND

1. Field

The disclosure of the present patent application relates to desalination systems, and particularly to a multistage desalination process with carbon dioxide capture that recovers valuable products where the reject brine is passed through multiple stages.

2. Description of the Related Art

Desalination plants are widely used to produce fresh water from saline water, such as seawater, for example. In general, desalination processes separate the saline water feed into a freshwater stream and a stream of concentrated brine. The concentrated brine is typically considered to be a waste product and is commonly recycled or disposed of with little additional treatment. However, since the saline water feed often contains many different dissolved ions, the concentrated brine contains a large quantity of desirable minerals which may be recovered for a wide variety of purposes.

In particular, reject brine can comprise many metal ions, such as sodium (Nat), magnesium ($Mg^{2+}$), calcium ($Ca^{2+}$), potassium ($K^+$), chloride ($Cl^-$), and sulfate ($SO_4^{2-}$). These components can be converted into many useful products which have various important industrial applications. Therefore, there is a need to find a way to utilize the reject brine instead of disposing of it.

The Solvay process is currently one of the most essential processes to treat reject brine from water desalination. The traditional Solvay process, where $CO_2$ is reacted with reject brine in the presence of ammonia ($NH_3$), results in the production of sodium bicarbonate ($NaHCO_3$) and ammonium chloride ($NH_4Cl$).

El-Naas et al., "A new process for the capture of $CO_2$ and reduction of water salinity", *Desalination*, 411 (2017) 69-75, describes a modified Solvay process wherein $NH_3$ is replaced with calcium oxide (CaO), which resulted in the production of $NaHCO_3$ and calcium chloride ($CaCl_2$). The latter can be utilized in a wide array of industrial applications.

Though some of these metal ions were converted to useful products, their recovery percentages remain less than desirable. Therefore, brine pretreatment prior to the modified Solvay process was proposed to enhance the recovery percentage of metals in reject brine. Several studies have investigated the recovery of the divalent ions such as $Ca^{2+}$ and $Mg^{2+}$ from seawater and brine because they are considered the main sources of these metals. Various processes have been developed, including chemical, physical, and biological processes.

Electrocoagulation was applied by Osman et al., "Electrocoagulation treatment of reject brine effluent from Solvay process", *Desalination and Water Treatment*, 163 (2019) 325-335, to remove $NH^{4+}$ and $Cl^-$ ions from the effluent stream of the traditional Solvay process. In another study by Den et al., "Removal of silica from brackish water by electrocoagulation pretreatment to prevent fouling of reverse osmosis membranes", *Separation and Purification Technology*, 59 (2008) 318-325, brackish water pretreatment was applied by the electrocoagulation method to remove the silica before entering the reverse osmosis process.

The efficiency of electrocoagulation to pretreat the water produced before entering to reverse osmosis membrane was studied by Zhao et al., "Hardness, COD and turbidity removals from produced water by electrocoagulation pretreatment prior to reverse osmosis membranes", *Desalination*, 344 (2014) 454-462. Under optimum conditions (pH=7.36, current density=5.90 mA/cm2, reaction time=30.94 min), the maximum hardness of 85.81, chemical oxygen demand of 66.64, and turbidity recovery of 93.80% were achieved.

Ezechi et al., "Boron removal from produced water using electrocoagulation", *Process safety and environmental protection*, 92 (2014) 509-514, concluded that the electrocoagulation process could effectively reduce boron from the water produced. Moussa et al., "A comprehensive review of electrocoagulation for water treatment: Potentials and challenges", *Journal of environmental management*, 186 (2017) 24-41, reviewed the effectiveness of electrocoagulation in the treatment of produced water and wastewater. It was mentioned that electrocoagulation is a promising technique and can play a critical role in water treatment, but still needs further research and optimization. A novel electrocoagulation column was developed by Hamdan and Muftah, "Characterization of the removal of Chromium (VI) from groundwater by electrocoagulation", *Journal of Industrial and Engineering Chemistry*, 20 (2014) 2775-2781, to evaluate the removal of some ions from brackish groundwater. Their results indicated the recovery of chromium ($Cr^{6+}$), copper ($Cu^{2+}$), zinc ($Zn^{2+}$), strontium ($Sr^{2+}$), magnesium ($Mg^{2+}$) and manganese ($Mn^{2+}$) were 100%, 74%, 70%, 59%, 44% and 33%, respectively.

Lime softening is considered one of the most common methods to remove seawater hardness ($Ca^{2+}$ and $Mg^{2+}$) before electrodialysis desalination and reverse osmosis processes. Rahardianto et al., "High recovery membrane desalting of low-salinity brackish water: Integration of accelerated precipitation softening with membrane RO", *Journal of Membrane Science*, 289 (2007) 123-137, reported that the recovery of low-salinity brackish water was optimized when reverse osmosis was integrated with accelerated precipitation softening due to a concentration reduction of more than 90%, 95% and 78% for $Ca^{2+}$, barium ($Ba^{2+}$), and $Sr^{2+}$, respectively. In another study, electrocoagulation combined with a sequence of softening was employed to treat the water produced from shale oil and gas operations. It was concluded that the combination of these two methods was ineffective in treating the collected samples. However, when softening was applied before electrocoagulation, it was observed that it was more efficient in recovering $Ba^{2+}$, $Sr^{2+}$, and boron ($B^{3+}$).

Recently, Mohammad et al., "Optimization of magnesium recovery from reject brine for reuse in desalination post-treatment", *Journal of Water Process Engineering*, 31 (2019), investigated the recovery of $Mg^{2+}$ from brine solution by the reaction with $NH_3$ solution. X-ray diffraction (XRD) indicated that up to 99% of $Mg^{2+}$ was recovered in the form of magnesium hydroxide ($Mg(OH)_2$) under 15° C. temperature, 85 g/L brine salinity, and 4.4 NH3 to 1 Mg molar ratio.

Accordingly, it is currently known that the pretreatment of some metal ions from reject brine and produced water can enhance the overall recovery efficiency of the posttreatment processes. However, the pretreatment of real reject brine from multi-flash desalination prior to the modified Solvay process has not yet been investigated.

In addition, the precipitation and high recovery of metal ions from the modified Solvay process depends on many parameters, mainly temperature, pH, and $CO_2$ gas flowrate. Although some metal ions could be reduced, other ions could not be recovered effectively under the same optimum conditions.

Therefore, there remains a need to develop a new technique, namely, a multi-stage desalination process, where a combination of chemical and electrocoagulation processes is implemented at different stages. Thus, a system and method for harvesting minerals from desalination brine solving the aforementioned problems is desired.

SUMMARY

The multistage desalination process with carbon dioxide capture is presented herein to address these needs. In the first stage, the $Mg^{2+}$ content of the brine is recovered through brine reaction with ammonium hydroxide ($NH_4OH$). In the following step, the ammoniated brine is reacted with a $CO_2$-air mixture to reduce brine salinity and capture $CO_2$ in one process based on the traditional Solvay process. Then the treated brine with $NH_4Cl$ solution is treated in an electrocoagulation step to recover the $NH_3$ and $SO_4^{2-}$ content in the presence of CaO.

In a further treatment stage, the CaO is added to the treated brine from the previous step and reacted with a $CO_2$-air gas mixture to further reduce brine salinity and carbon dioxide capture according to the modified Solvay process. In the following stage, the treated brine is mixed with $NH_4HCO_3$ to reduce the solubility of bicarbonate products, and hence an increased recovery of NaHCO3 is attained. After that, the treated brine mixture is reacted again with CaO and $CO_2$-air gas mixture for additional enhancement in ions removal and $CO_2$ capture efficiency. In the last stage, the treated brine is inserted into the electrocoagulation cell to recover the $CaCl_2$ and $NH_3$ compounds.

In one embodiment, the present subject matter relates to a method of desalinating brine with carbon dioxide capture, comprising the steps of:

a. mixing a brine with an ammonia solution, whereby $NH_3$ in the ammonia reacts with magnesium carbonate ($MgCO_3$) in the brine to produce $NH_4HCO_3$ and magnesium hydroxide $MG(OH)_2$ solids, with the magnesium hydroxide solids being precipitated from the brine and recovered via filtration, resulting in a first treated brine;

b. reacting the first treated brine with a first $CO_2$-air gas mixture to produce first sodium bicarbonate ($NaHCO_3$) solids and ammonium chloride ($NH_4Cl$) and capture $CO_2$, with the first sodium bicarbonate solids being precipitated from the first treated brine and recovered via filtration, resulting in a second treated brine;

c. reacting the second treated brine with first calcium oxide (CaO) to recover sulphate content from the second treated brine in the form of gypsum ($CaSO_4$) solids and to recover most remaining ammonia added in step a. as ammonium hydroxide, with the gypsum solids being precipitated from the second treated brine and recovered via filtration, resulting in a third treated brine;

d. reacting the third treated brine with second calcium oxide (CaO) and a second $CO_2$-air gas mixture to produce second sodium bicarbonate ($NaHCO_3$) solids and capture further $CO_2$, with the second sodium bicarbonate solids being precipitated from the third treated brine and recovered via filtration, resulting in a fourth treated brine;

e. reacting the fourth treated brine with ammonium bicarbonate ($NH_4HCO_3$) solids to decrease solubility of and thereby produce third sodium bicarbonate ($NaHCO_3$) solids, with the third sodium bicarbonate solids being precipitated from the fourth treated brine and recovered via filtration, resulting in a fifth treated brine;

f. reacting the fifth treated brine with third calcium oxide (CaO) and a third $CO_2$-air gas mixture to produce fourth sodium bicarbonate ($NaHCO_3$) solids and capture additional further $CO_2$, with the fourth sodium bicarbonate solids being precipitated from the fifth treated brine and recovered via filtration, resulting in a sixth treated brine; and g. recovering ammonium added in step e., calcium ions added in step f., and chloride ions from the sixth treated brine, with the ammonium mostly being recovered as $NH_3$ gas, the calcium and chloride ions being recovered as precipitated calcium hydroxide ($Ca(OH)_2$) solids, $Cl_2$ gas, and $CaCl_2$ solution, resulting in a desalinated brine.

In one embodiment, the present methods provide for a decrease in soluble ion concentration after each successive stage. That is, each successive treated brine can have fewer soluble ion concentrations than the preceding brine or treated brine. Similarly, each successive treated brine can have a total Na concentration reduced from the preceding brine or treated brine. Each successive treated brine can likewise have a total potassium concentration reduced from the preceding brine or treated brine, such that the final treated brine has a potassium concentration of 200 ppm or less.

An overall goal of the present methods is desalination of brine, i.e., Na removal from the brine. The three most important components to remove from the brine to maximize desalination efficiency are calcium, sulfate, and magnesium. The present methods provide the previously unknown correct sequence to remove these components from the brine so sodium can be most effectively precipitated as sodium carbonate with a minimization of competing reactions. For example, in an embodiment, the brine in Stage 4 has essentially no magnesium or sulfates.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
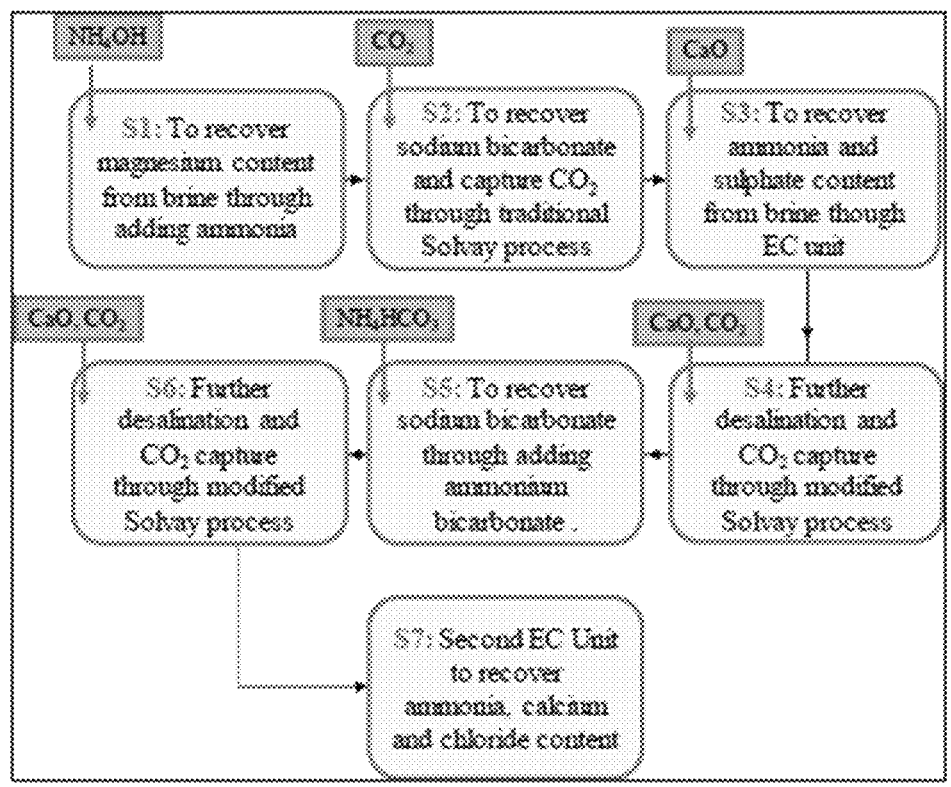
FIG. 1 is a schematic diagram of a multistage desalination process with carbon dioxide capture.

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In one embodiment, the present subject matter relates to a new method for brine desalination and $CO_2$ capture to recover valuable products. According to certain instances of this new method, the reject brine is passed through a total of seven stages. In each stage, a specific metal ion is recovered. A combination of chemical and electrocoagulation (EC) processes are implemented at different stages of the overall process. The present multistage process generally is conducted as shown in the schematic diagram of FIG. 1.

According to the process as shown in FIG. 1, in the first stage, an almost 100% recovery of magnesium ions ($Mg^{2+}$) in the form of magnesium hydroxide ($Mg(OH)_2$) solids can be obtained by chemical reaction with ammonia ($NH_3$) solution. This ammoniated brine is then sent to the second stage.

Then, in the second stage, the ammoniated brine can be treated based on a traditional Solvay process, where $Na^+$ reduction, in the form of sodium bicarbonate ($NaHCO_3$), and $CO_2$ uptake can reach almost 32.97% and 37 g of $CO_2$/1000 mL of treated brine, respectively. In certain embodiments, $Na^+$, $Ca^{2+}$, $K^+$, $Cl^-$, and $SO_4^{2-}$ can be reduced by 32.97%, 87.48%, 58.57%, 17.77%, and 17.83%, respectively, in this second stage of the process.

In the third stage, an electrocoagulation (EC) process can be used to recover the sulfate ions ($SO_4^{2-}$) in the form of pure calcium sulfate ($CaSO_4$) solids, and for the regeneration of $NH_3$ as ammonium hydroxide, leading to a potential total reduction of 96.5% for $SO_4^{2-}$ ions.

In the fourth stage, CaO can be added to the treated brine according to a modified Solvay process. Reductions of 37.98% and 27.97% in Na and chlorine $Cl^-$ ions can be achieved at this stage, respectively, as can further $CO_2$ capture.

In the fifth stage, more recovery of $NaHCO_3$ can be attained by adding ammonium bicarbonate ($NH_4HCO_3$) to the treated brine, thereby enhancing the precipitation of the $NaHCO_3$.

In the sixth stage, the treated brine mixture can be passed through a second modified Solvay process. The $CO_2$ uptake can reach up to 60 g of $CO_2$/1000 ml, or higher.

In the seventh and last stage, the treated brine can be inserted into a second EC process to recover $CaCl_2$ solution and $NH_3$ compounds. The overall reductions of the whole process for Na$^+$, Ca$^{2+}$, K$^+$, Mg$^{2+}$, Cl$^-$ and SO$_4^{2-}$ can reach about 43.11%, 92.55%, 75.80%, 99.90%, 34.50%, and 96.45% or more, respectively. In another embodiment, the overall reductions of the whole process for Na$^+$, Ca$^{2+}$, K$^+$, and Cl$^-$ can reach about 51%, 93.59%, 79%, and 43.63% or more respectively. Moreover, solid products from each stage (for example, NaHCO$_3$, CaCl$_2$, Mg(OH)$_2$, and CaCO$_3$) have diverse industrial applications.

In this regard, the characterization of the collected solid products in each stage is examined by using X-ray diffraction (XRD), scanning electron microscopy (SEM), Fourier transform infrared (FTIR) spectroscopy, and Raman analyses to evaluate the composition and main physical and chemical properties for the recovered solids.

The present methods, systems, and processes can be used to enhance desalination of reject brine with high salinity while recovering various solids from every stage of the process.

More details of each stage of the present methods, systems, and processes are as described below with reference to an exemplary process herein.

Stage 1 (S1): Magnesium Recovery Through Reaction with NH$_4$OH

In stage 1, an initial brine is mixed with an ammonia (NH$_4$OH) solution, whereby NH$_3$ in the ammonia reacts with magnesium carbonate (MgCO$_3$) in the brine to produce NH$_4$HCO$_3$ and magnesium hydroxide Mg(OH)$_2$ solids as shown in the following Reactions (1) and (2):

$$NH_3 + H_2O \leftrightarrow NH_4^+ + OH^- \quad (3)$$

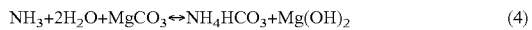
$$NH_3 + 2H_2O + MgCO_3 \leftrightarrow NH_4HCO_3 + Mg(OH)_2 \quad (4)$$

The magnesium hydroxide solids can be precipitated from the brine and recovered via filtration, resulting in a first treated brine.

In certain embodiments in this regard, for the first stage, the brine and ammonia solution can be mixed at a molar ratio of 2-10 mols NH$_3$:1 mol NaCl in the brine. Likewise, the brine and ammonia can be mixed at molar ratios of 2.5-8:1, 2.75-5:1, 3-3.5:1, 2:1, 3:1, 4:1, 5:1, or 3.3:1 of NH$_3$:NaCl in the brine. In one embodiment, an excess amount of the ammonia in the form of an aqueous NH$_4$OH solution is mixed with the brine to ensure complete recovery of magnesium and efficient CO$_2$ capture in further steps of the method. That is, the first treated brine can have almost no Mg content. For example, the first treated brine can have a Mg content of up to 5%, 4%, 3%, 2%, 1%, or 0.5% by weight. Regarding Na$^+$ reduction, the first treated brine can have a Na$^+$ reduction, when compared to the initial brine, of about 30-36%, 30%, 31%, 32%, 33%, 34%, 35%, or 36%.

Similarly, Stage 1 can result in a CO$_2$ capture efficiency of about 80-90%, 84-88%, 80%, 81%, 82%, 83%, 84%, 85%, 86%, 87%, 88%, 89%, or 90%.

In other embodiments, Stage 1 can be conducted at a temperature of 10-20° C. Likewise, Stage 1 can be conducted at a temperature of 12-18° C., 10° C., 11° C., 12° C., 13° C., 14° C., 15° C., 16° C., 17° C., 18° C., 19° C., or 20° C.

In one specific example in this regard, a brine sample of 1000 mL was mixed properly with NH$_4$OH solution at a molar ratio of (3.3 NH$_3$:1 NaCl molar ratio) for five minutes to precipitate the magnesium content, where NH$_3$ reacted with magnesium carbonate (MgCO$_3$), considered to be the major component of the rejected brine. Magnesium reacted with NH$_3$, yielded a mixture of NH$_4$HCO$_3$ and magnesium hydroxide. The initial pH of the brine-ammonia mixture was measured for each experiment; the mixture was then placed on a shaker for 24 h at a controlled temperature of 15° C. Samples were then filtered using the Buchner funnel setup. The collected solids were then dried at a temperature of 120° C. for 24 h. SEM, XRD, FTIR, and Raman analyses were conducted for the recovered solids from this stage.

Stage Two (S2): NaHCO$_3$ Recovery Unit

In Stage 2, the first treated brine from Stage 1 can be reacted with a first CO$_2$-air gas mixture to produce first sodium bicarbonate (NaHCO$_3$) solids and ammonium chloride (NH$_4$Cl) and capture CO$_2$. The first sodium bicarbonate solids can be precipitated from the first treated brine and recovered via filtration, resulting in a second treated brine.

In certain embodiments, Stage 2 can be conducted at a temperature of 15-25° C. Likewise, Stage 2 can be conducted at a temperature of 17-23° C., 15° C., 16° C., 17° C., 18° C., 19° C., 20° C., 21° C., 22° C., 23° C., 24° C., or 25° C.

In one specific example in this regard, the treated brine from S1 was reacted with a CO$_2$-air gas mixture based on a Solvay process.

According to the Solvay process, the reaction at this Stage proceeds through the following two steps:

$$NH_4OH + CO_2 \rightarrow NH_4HCO_3 \quad (5)$$

$$NaCl + NH_4HCO_3 \rightarrow NaHCO_3 + NH_4Cl \quad (6)$$

The main unit for this stage and where reactions occur was an inert particle spouted bed reactor (IPSBR). Inert mixing particles with an average density of 1,020 kg/m$^3$ and an average diameter of 0.013 m were used to improve the contact between the two phases. The particles volume fraction of about 6% (volume of particles/volume of reject brine) was used. The reactor had an internal diameter of 0.078 m, a height of 0.850 m, and a total working volume of 3,000 ml. A water jacket surrounding the IPSBR system was used to control the reaction temperature through the water circulation bath set at a temperature of 20° C. Initially, IPSBR was filled with the treated brine from S1 and then exposed to a continuous CO$_2$ flow through an orifice (diameter=2 mm) from the bottom of the reactor. The gas flow rate was controlled to be 1000 ml/min by a mass flow controller. The outlet gas stream was continuously passed through a CO$_2$ gas analyzer to determine the amount of CO$_2$ captured. The end of each experiment was determined when the saturation point was reached, i.e., when the CO$_2$ concentration at the outlet became equal to its inlet value. That is, Stage 2 is complete when concentration of captured CO$_2$ is equivalent to concentration of CO$_2$ added in the first CO$_2$-air gas mixture. The collected mixture was filtrated at the end of each experiment to separate the liquid from the produced solids. The solid characteristics were investigated by using SEM, XRD, FTIR, and Raman analyses.

Stage Three (S3): NH$_3$ and SO$_4^{2-}$ Recovery Stage

In Stage 3, the second treated brine from Stage 2 can be reacted with a first calcium oxide (CaO) to recover sulphate content from the second treated brine in the form of sulphate solids and to recover most remaining ammonia added in step a. with the sulphate solids being precipitated from the second treated brine and recovered via filtration, resulting in a third treated brine. In some embodiments, the ammonia can be recovered as ammonium hydroxide, NH$_4$Cl, or both. In certain embodiments, after completion of Stage 3, about 80-85% of the ammonia added in Stage 1 can be recovered. Likewise, the SO$_4^{2-}$ can be recovered as gypsum (CaSO$_4$) solids, Na$_2$SO$_4$, or both. Thus, after completion of Stage 3, the third treated brine can have an absence of magnesium (removed in Stage 1) and sulfates, thereby enhancing the possibility for Na removal in Stage 4. That is, the third treated brine can have almost no sulphate content. For example, the third treated brine can have a sulphate content of up to 5%, 4%, 3%, 2%, 1%, or 0.5% by weight.

These recoveries can be based on compact sulfate chemical precipitation and ammonia stripping in the presence of the first calcium oxide. This can take place inside a closed electrocoagulation cell instead of in a separate stage or in a series of singular treatment processes. In this regard, the second treated brine, after filtration, can be inserted into a closed electrocoagulation cell for Stage 3 to be conducted.

In one specific example in this regard, the following reactions represent the recovery process of sulfate as gypsum ($CaSO_4$) from the second treated brine using the first CaO.

$$CaO + H_2O \rightarrow Ca(OH)_2 \quad (7)$$

$$Ca(OH)_2 + Na_2SO_4 \rightarrow CaSO_4 + 2NaOH \quad (8)$$

The common $NH_4Cl$ recovery involved the reaction of a hot solution with CaO at temperatures of 160° C.-230° C. CaO makes a strong basic solution, and the released ammonia gas can be recycled and used again in the initial step of the Solvay process according to the chemical reaction given below.

$$2NH_4Cl + Ca(OH)_2 \rightarrow 2NH_3(g) + 2H_2O + CaCl_2 \quad (9)$$

The compact $SO_4^{2-}$ precipitation and $NH_3$ stripping in the presence of CaO inside the electrocoagulation cell involve passing a current through aluminum electrodes and generating the cathodic and anodic chemical reactions according to the chemical reactions given below.

The anode dissolution, which results in electrodes ions $Al^{3+}_{(aq)}$:

$$Al(s) \rightarrow Al^{3+}_{(aq)} + 3e- \quad (10)$$

Water electrolysis, which results in hydrogen gas and hydroxide ions:

$$2H_2O_{(aq)} + 2e- \rightarrow H_{2(g)} + 2OH^- \quad (11)$$

The first step of the coagulant formation in its initial form:

$$Al^{3+}_{(aq)} + OH^-_{(aq)} \rightarrow Al(OH)_{3(s)} \quad (12)$$

The cathode electrode reaction during the electrocoagulation results in the formation of ammonia gas as shown in Equation (13), being the main process for the removal of ammonium ion ($NH_4^+$).

$$2NH_4^+ + 2e- \rightarrow 2NH_3(g) + H_2(g) \quad (13)$$

For the sulfate removal, the ions formed in the anodic dissolution reaction according to Equation (10) $Al^{+3}_{(aq)}$ promote the chemical precipitation and provide more driving force to precipitate the sulfate content as follows:

$$3Ca(OH)_{2(s)} + 2Al^{3+}_{(aq)} + 3SO_4^{2-} \rightarrow 2Al(OH)_{3(s)} + 3CaSO_{4(s)} \quad (14)$$

In addition, a complex reaction through chemical precipitation by combining the aluminum hydroxide ($Al(OH)_3$) with other soluble ions through the electrocoagulation process is as follows:

$$Cations_{(aq)} + anions_{(aq)} + xAl(OH)_{3(s)} + x(H_2O)_{(aq)} \rightarrow complex\ xAl(OH)_3X(H_2O)_{(s)} \quad (15)$$

The current was applied once CaO was added to the treated brine with a concentration of 3.5 g/100 mL brine. The electrochemical reaction was conducted for five hours to ensure maximum $NH_3$ and $SO_4^{2-}$ recovery. At the end of each run, the treated brine sample was collected and then settled for 24 hours to ensure a complete coagulation process at room temperature. Then, it was filtered using a Buchner funnel filtration kit to separate the solid coagulants. After filtration, all solid products were dried at 120° C. in an oven for 24 h. Then, the dried solids were identified and analyzed using SEM, XRD, FTIR, and Raman analyses.

Stage Four (S4): CaO-Based Modified Solvay Process Stage

In Stage 4, the third treated brine from Stage 3 can be reacted with a second calcium oxide (CaO) and a second $CO_2$-air gas mixture to produce second sodium bicarbonate ($NaHCO_3$) solids and capture further $CO_2$, with the second sodium bicarbonate solids being precipitated from the third treated brine and recovered via filtration, resulting in a fourth treated brine.

In one specific example in this regard, the collected brine from stage three and after filtration was accumulated, then 1000 mL of the treated brine sample was reacted with a $CO_2$-air gas mixture in an IPSBR system. The same experimental methodology for S2 was conducted, except the alkaline material ($NH_3$) was replaced with a specific concentration of CaO. The CaO was added directly to the reactor, which converted to $Ca(OH)_2$ as soon as it contacted the treated brine, raised the pH and captured $CO_2$.

This stage provided further brine desalination and $CO_2$ capture after eliminating the presence of the competing ion species, such as the magnesium and sulfate ions, from S1 and S3, respectively. That is, Stage 4 can be conducted in the absence of magnesium and sulphates. At the end of the experimental run (zero $CO_2$ capture percentage), the collected mixture was filtrated to separate the solid products, dried and analyzed using SEM, XRD, FTIR, and Raman analyses.

Stage Five (S5): Chemical Reaction with $NH_4HCO_3$

In Stage 5, the fourth treated brine from Stage 4 can be reacted with ammonium bicarbonate ($NH_4HCO_3$) solids to decrease solubility of and, thereby, produce third sodium bicarbonate ($NaHCO_3$) solids, with the third sodium bicarbonate solids being precipitated from the fourth treated brine and recovered via filtration, resulting in a fifth treated brine.

Not all of the produced $NaHCO_3$ products from the fourth stage were collected as solids at the end thereof, where the high solubility of this component limited its precipitation even at high pH value and low temperature. However, this high solubility can be reversed by the addition of $NH_4HCO_3$. $NH_4HCO_3$ can be used in the modified Solvay process since it is a significant intermediate in the formation of $NaHCO_3$ and can enhance the efficiency of desalinating the reject brine. Raising the concentration of $NH_4HCO_3$ and hence increasing the concentration of ($HCO_3^-$) would drive Reaction (16) to the left and lower the solubility of $NaHCO_3$.

$$NH_4HCO_3(a) \leftrightarrow NH_4^+ + HCO_3^- \quad (15)$$

$$NaHCO_3(a) \leftrightarrow Na^+ + HCO_3^- \quad (16)$$

In one specific example in this regard, the following steps were carried out to decrease the solubility of $NaHCO_3$ solids. The addition of $NH_4HCO_3$ to the fourth treated brine was at 13% wt. $NH_4HCO_3$, which was mixed under room temperature with brine for 15 min with a mixing rate of 50 rpm. The mixture was then kept in the refrigerator at 7° C. for 24 hr to ensure maximum $NaHCO_3$ precipitation. Then, the recovered solids from this mixture were collected through Buchner filtration to be dried and analyzed using SEM, XRD, FTIR, and Raman analyses. The fifth treated brine was collected to be sent to the sixth stage.

Stage Six (S6): Second CaO-Based Modified Solvay Process

In Stage 6, the fifth treated brine from Stage 5 can be reacted with third calcium oxide (CaO) and a third $CO_2$-air gas mixture to produce fourth sodium bicarbonate ($NaHCO_3$) solids and capture additional further $CO_2$, with the fourth sodium bicarbonate solids being precipitated from the fifth treated brine and recovered via filtration, resulting in a sixth treated brine.

Figure 2:
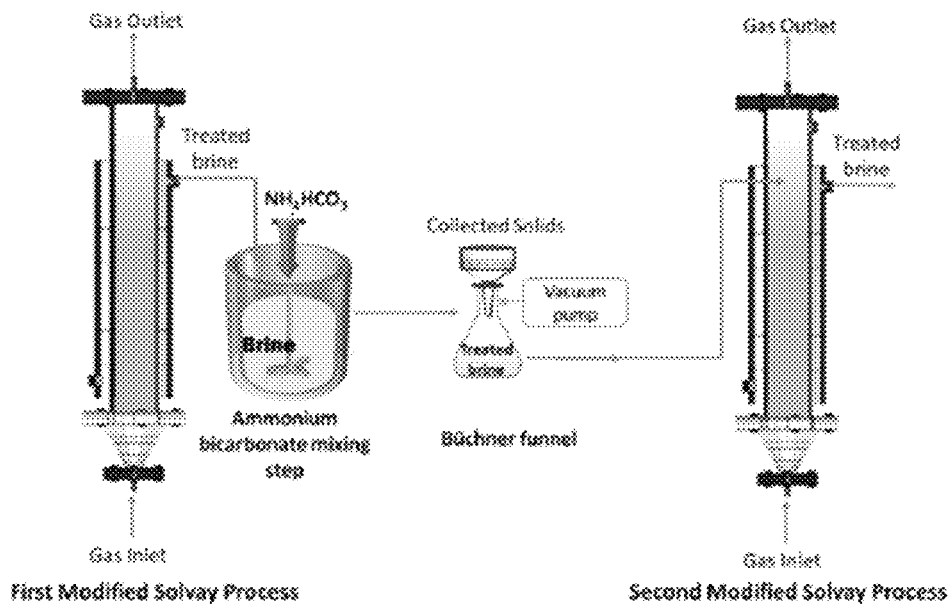
FIG. 2 is a schematic diagram for stages 4, 5, and 6 of the present multistage desalination process with carbon dioxide capture.

In one specific example in this regard, the same experimental methodology for S4 was conducted in S6 to run the chemical reaction based on the CaO-based modified Solvay process, as demonstrated in FIG. 2. The aim of this stage is to ensure further metal ions reduction and more $CO_2$ capture. The fifth treated brine from S5, which was inserted into the IPSBR system, contained a soluble $NH_4HCO_3$. This caused the treated solution to be oversaturated with $HCO_3$, resulting in high precipitation of $NaHCO_3$.

At the end of the experimental run (zero $CO_2$ capture parentage), the collected mixture was filtrated to separate the solid products, which were dried and then analyzed using SEM, XRD, FTIR, and Raman analyses for solids characteristics and morphology.

Stage Seven (S7): Second Electrocoagulation Treatment to Recover $NH_3$ and Calcium Content In Stage 7, ammonium added in Stage 5, calcium ions added in Stage 6, and chloride ions can be recovered from the sixth treated brine, with the ammonium mostly being recovered as $NH_3$ gas, the calcium and chloride ions being recovered as precipitated calcium hydroxide ($Ca(OH)_2$) solids, $Cl_2$ gas, and $CaCl_2$ solution, resulting in a desalinated brine.

In one specific example in this regard, the treated brine from S6 contained high concentrations of ammonium and calcium ions resulting from S5 and S6, respectively. The electrocoagulation process was used to recover most of the ammonium content as $NH_3$ gas as above using Reaction (13). As for the previous electrocoagulation process, Stage 7 can further use an electric current to maximize the involved reactions. For $CaCl_2$, the water electrolysis, which resulted in hydrogen gas and hydroxide ions as described in Reaction (11), promoted the precipitation of calcium hydroxide. On the other hand, the $Cl^-$ ions resulted in chlorine gas formation on the anode side, as shown in Reaction (17) and (18).

$$CaCl_{2(aq)} + OH^- \longrightarrow Ca(OH)_{2(s)} + 2Cl^- \quad (17)$$

$$2Cl^- \rightarrow Cl_2(g) + 2e^- \quad (18)$$

The collected solids from this stage were dried and tested using SEM, XRD, FTIR, and Raman analyses for solids characteristics and morphology. After each stage, the brine salinity and ion concentrations were measured and evaluated based on the specific stage performance. The amount of $CO_2$ uptake (g $CO_2$/1000 mL treated brine) for S2, S4 and S6 was calculated based on the following Equations (19) and (20).

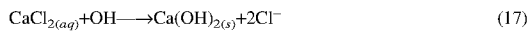

$$\text{Moles of CO2 reacted} = \frac{\int \text{volume of CO2 capturedt (L/min)} \cdot dt}{\text{Molar volume of CO2 (L/mol)}} \quad (19)$$

$$\text{CO2 uptake (g CO2/vol. treated brine)} = \frac{\text{moles of CO2 reacted} \times \text{MW of CO2}}{\text{Volume of treated brine}} \quad (20)$$

In an embodiment, one or more stages of the present multistage process can be conducted at a temperature of 20° C., a gas flow rate of 1.54 L/min, and a molar ratio of almost 3.3 moles $NH_3$ to 1 mole NaCl, resulting in a $CO_2$ capture efficiency of about 86% and $Na^+$ reduction of about 33%. For example, Stage 1 can be conducted at these parameters, Stage 2 can be conducted at these parameters, or Stage 1 and Stage 2 can be conducted at these parameters. In certain embodiments, these stages can be conducted at a temperature of 10-20° C. Likewise, these stages can be conducted at a temperature of 12-18° C., 10° C., 11° C., 12° C., 13° C., 14° C., 15° C., 16° C., 17° C., 18° C., 19° C., or 20° C.

Similarly, these stages can be conducted at a gas flow rate of 1-2 L/min, 1.1-1.9 L/min, 1.2-1.8 L/min. 1.3-1.7 L/min, 1.4-1.6 L/min, 1.5 L/min, or 1.54 L/min.

XRD Analysis for the Collected Solids from the Multi-Stage Desalination Process

The collected solids from the specific examples of each stage of the present multistage process mentioned above were studied and analyzed.

Figure 3:
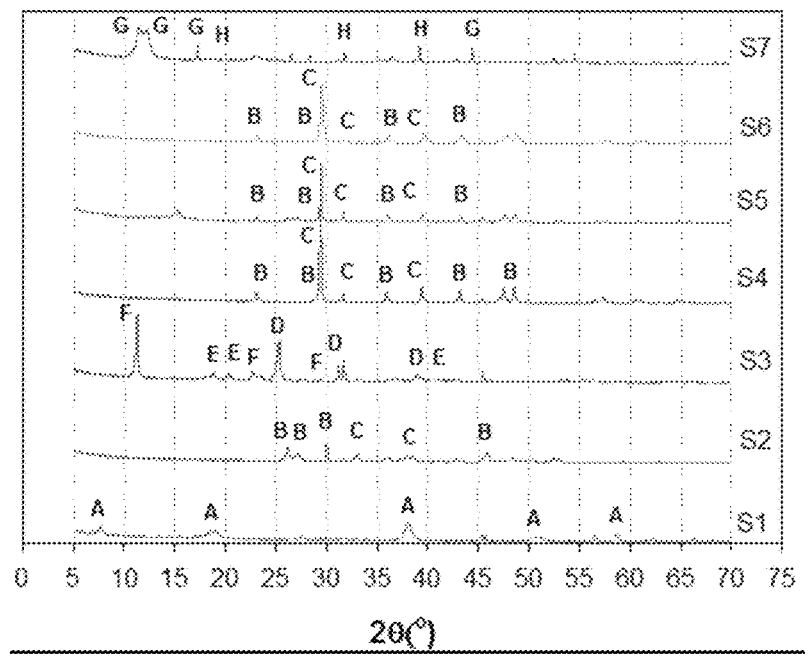
FIG. 3 is a line chart showing X-ray diffraction patterns of dried and collected solids from S1, S2, S3, S4, S5, S6, and S7.

The XRD analysis for the collected solids from 51 confirmed the recovery of the brine magnesium content in the form of magnesium hydroxide (Brucite-$Mg(OH)_2$). The presence of peaks related to brucite at 2θ 38.02, 18.59, and 50.85 is shown in FIG. 3, at the S1 line, and Table 1. The high purity for the recovered magnesium component was confirmed through Thermogravimetric (TG) analysis, where the thermal degradation temperature and the mass loss for the recovered components were very close to the theoretical ones.

TABLE 1

| Symbol | Formula | Mineral |
|---|---|---|
| A | $Mg(OH)_2$ | Brucite |
| B | $CaCO_3$ | Calcite / Vaterite |
| C | $NaHCO_3$ | Nahcolite |
| D | $CaSO_4$ | Calcium sulfate |
| E | $Al(OH)_3$ | Bayerite and Doyleite |
| F | $Ca_3Al_2(OH)_3 \cdot xH_2O$ | Hydrocalumite |
| G | $Ca_3Al_2(OH)_{12}$ | Kaoite |
| H | $CaCl_2$ | Hydrophilite |

The XRD analysis for the solids collected from S2 (traditional Solvay process) shows that not only nahcolite ($NaHCO_3$) is recovered from this stage, but also $CaCO_3$ was confirmed on the C indicated peaks in FIG. 3 as vaterite. This indicates that not only Na ions react with the $CO_2$ gas and $NH_3$; other ions such as calcium still have good reactivity and precipitate under the same mentioned reaction conditions. It is also important to note that other ions such as $K^+$ could have good reactivity with the $CO_2$ gas and $NH_3$; however, the low $K^+$ concentration compared with $Na^+$ and $Ca^{2+}$ ions decreased the intensity of the detected peaks.

For the third stage (S3), the electrochemical treatment using aluminum electrodes was conducted for the clear effluent of S2. As expected, the recovery of the $SO_4^{2-}$ products was confirmed by the presence of calcium sulfate (Anhydrite—$CaSO_4$) as the most three intensive peaks are located at 2θ of 25.5, 31.37, and 38.64. In addition, the presence of $Al(OH)_2$ is indicated by the peaks with symbol E on the S3 line at FIG. 3. The low peak intensity of ($Al(OH)_2$) confirmed the low concentration in the recovered solid, and which was in agreement with the low applied current density (20 mA/cm$^2$), which resulted in a reasonable electrode dissolution. On the other hand, a complex, namely, hydrocalumite ($Ca_3Al_2(OH)_3 \cdot xH_2O$) was formed based on Reaction (15), which confirmed the possible effect of the electrocoagulation process in the recovery of the $Ca^{2+}$ ions.

This mainly would be effective after completing the modified Solvay process (S4), where a specific concentration of CaO (20 g CaO/100 mL brine) was added, and after a reaction with $CO_2$ gas, a proper method was required to recover the soluble $CaCl_2$ content from the treated brine based on Reaction (2).

In S4, the clear effluent from S3 was reacted with CaO and $CO_2$ gas based on the modified Solvay process as indicated by Reaction (2), wherein $NaHCO_3$ was produced. However, as is the case in the traditional Solvay process, the $Ca^{2+}$ content in the brine was reacted with $CO_2$ gas and produced $CaO_3$ but on the calcite structure as indicated by the peaks located at 29.0, 43.15, and 39.4. As demonstrated by the S4 line at FIG. 3, one of the calcite structures indicating peaks overlap with one of the $NaHCO_3$ intensive peaks.

Reacting the treated effluent resulting from S4 with $NH_4HCO_3$ (according to the method described in S5) resulted in the formation of sodium bicarbonate crystals, showing almost the same composition of the solids collected from S4. However, S4 resulted in a powder rather than crystalline solids form. According to Reaction (15) and (16), $NaHCO_3$ should precipitate because of increasing the concentration of bicarbonates ($HCO_3^-$). In addition, XRD analysis revealed the production of $CaCO_3$, which existed in the collected crystals. This could be explained by the formation of calcium bicarbonate ($Ca(HCO_3)_2$), which is converted directly to $CaCO_3$ according to Equation (21):

$$Ca(HCO_3)_2 \rightarrow CO_2 + H_2O + CaCO_3 \quad (21)$$

However, most of the $NaHCO_3$ was not changed to sodium carbonate ($Na_2CO_3$) because the drying temperature of the collected solid samples from S4, S5, and S6 was around 50° C., kept for 24 h to prevent the decomposition of the bicarbonate to carbonate components based on the following reaction that occurs at a temperature of 80° C.:

$$NaHCO_3 \rightarrow CO_2 + H_2O + Na_2CO_3 \quad (22)$$

Stage six (S6) refers to the second modified Solvay process, resulting in the same products from the first modified Solvay process ($NaHCO_3$ and $CaCO_3$). However, lower intensities for these products were noticed and hence lower solids recovery from this stage which indicates that the $Na^+$ and $Ca^{2+}$ removal is lower because of decreasing the initial concentrations of $Na^+$ and $Ca^{2+}$ ions compared to the first step of the modified Solvay process, hence decreasing the driving forces for S6.

Introducing the last stage, S7, to the multi-stage desalination process aimed to reduce the concentration of $CaCl_2$ ions resulting from the sequenced modified Solvay process. S7 proved successfully that the electrocoagulation process could recover some of the $CaCl_2$ in the form of coagulant hydrophilite ($CaCl_2$) product as well as to other components such as katotite ($Ca_3Al_2(OH)_{12}$). The presence of aluminum species is related to the anode electrode dissolution under high pH value.

SEM Analysis of the Collected Solids from the Multi-Stage Desalination Process

The collected solids structure and external morphology were examined by scanning electron microscopy (SEM) for the fine and dried solid samples collected after each specific stage. FIGS. 4(a)-(g) show the SEM captured images and the EDS analysis over three captured spots for each tested sample. Scanning all the collected pictures from the multi-stage desalination process indicates major and clear differences between the collected solids structure, morphology, and physical properties collected from each stage.

Figure 4A:
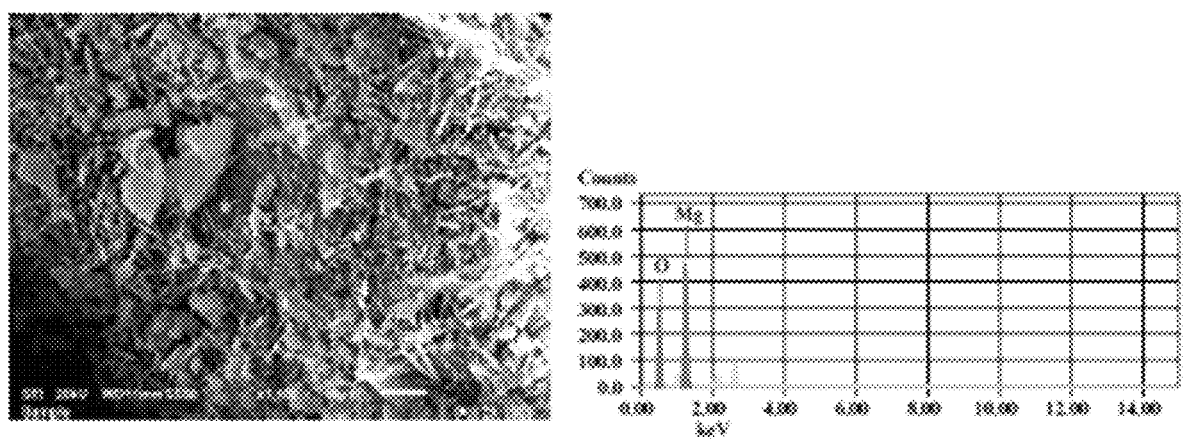
FIGS. 4(a)-4(g) show results from SEM and EDS analyses for the produced solids from (a) S1, (b) S2, (c) S3, (d) S4, (e) S5, (f) S6, and (g) S7.

FIG. 4(a) illustrates the EDS analysis for solids produced from S1, which is related to the $Mg(OH)_2$ structure based on the XRD analysis and EDS analysis (exempting the confirmation of the presence of hydrogen species which is not possible to be detected by EDS analysis). The morphology of the obtained particles was a mix between the plate and needle-like morphology. The dominant presence of longitudinal crystallites of irregular form was observed.

Figure 4B:
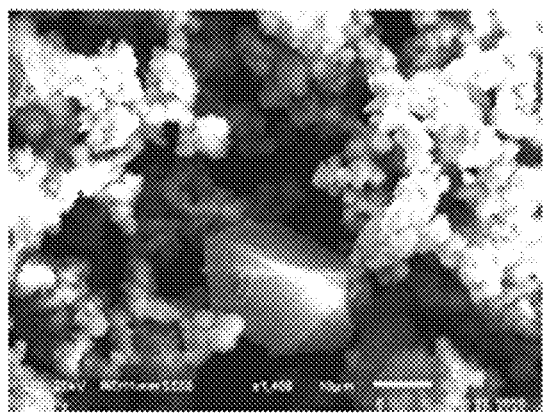
Figure 4B:
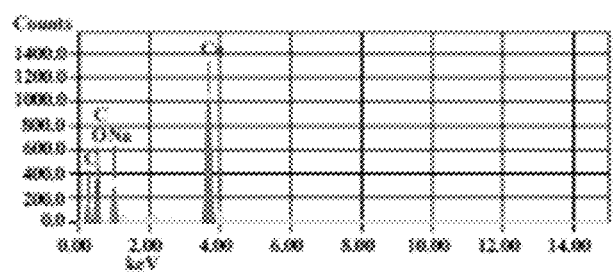

For S2, the first component structure recognized is the polycrystalline vaterite ($CaCO_3$), typically having a spherical crystal habit like the one shown in FIG. 4(b). The spherical form is also called raspberry or framboid structure shape. A closer photo showed that these spherical crystals are composed of smaller single-crystal sub-units. Sodium bicarbonate in the same figure clearly indicated the elongated rods, which have a bigger particle size than the calcium carbonate.

Figure 4C:
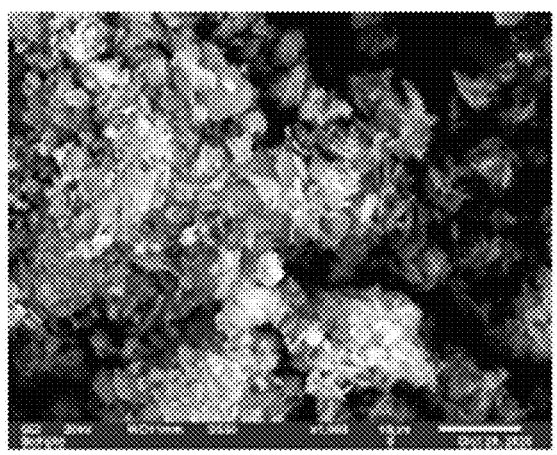
Figure 4C:
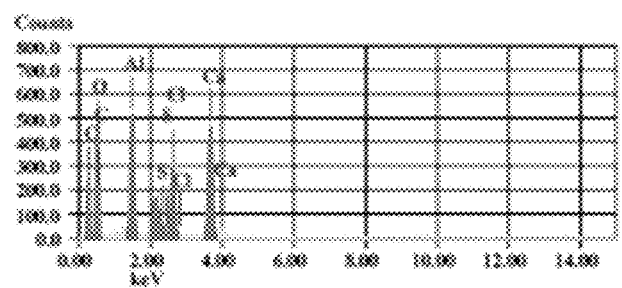

The EDS analysis for the solids collected from S3 (FIG. 4(c)) confirms the presence of $SO_4^{2-}$, $Cl^-$, and aluminum species beside Ca, Na, carbon (C), and oxygen (O). This was expected based on the electrochemical coagulation and chemical precipitation for aluminum and $SO_4^{2-}$ species, respectively. The presence of the coagulated Ca and Na components was expected based on the complex formation based on Reaction (15). The presence of $Cl^-$ species could be referring to the decomposition of the soluble ammonium chloride formed based on Reaction (6) to release the ammonia gas ($NH_3$) based on Reaction (13) and following by complex formation containing $Cl^-$ ions based on Reaction (15). However, the $Cl^-$ species was not confirmed by the XRD analysis for this specific stage; the low concentration of the complexes containing $Cl^-$ could be a reasonable explanation for missing the identifying peaks for those components. The SEM image shows many different morphological structures, such as moderate-sized needles and small shells surrounding few rhombic crystals. Needle morphology could be related to the $CaSO_4$ component (gypsum), while the shells and lamellar structures are adequately related to the aluminum hydroxide. It was confirmed that this specific morphology is formed only at high pH values, which is the case for S3, where CaO is added to enhance the sulfate precipitation, and a pH value of more than 11 was achieved at the start of the electrocoagulation process. The rhombic structure could be related to the different complexes formed based on Reaction (15) such as hydrocalumite, confirmed based on the XRD analysis.

Figure 4D:
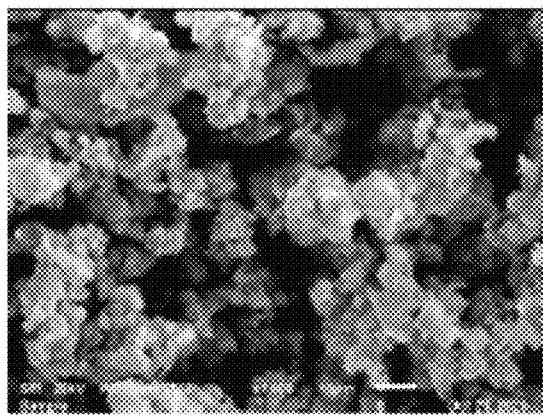
Figure 4D:
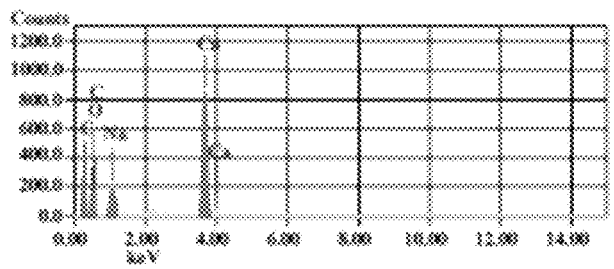
Figure 4E:
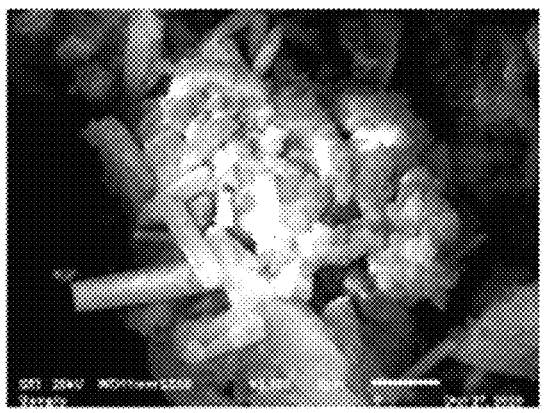
Figure 4E:
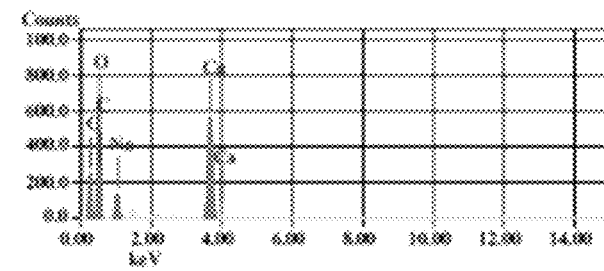

The EDS analysis of solids collected from S4 shown in FIG. 4(d) confirmed the presence of $NaHCO_3$ and $CaCO_3$, as indicated by the XED analysis in the previous section. However, the structure of the formed $NaHCO_3$ changed to a more irregular form and smaller in particle size compared to the $NaHCO_3$ formed in S2. This change may significantly relate to the alkaline material added for each stage, where ammonia and CaO were used as buffering agents in S2 and S4, respectively. Also, the XRD analysis shows different $CaCO_3$ crystal structures as vaterite and calcite for S2 and S4, respectively. There was no apparent difference observed for the same component using the SEM analysis. This can be explained by the presence of $NaHCO_3$ as additives that have a significant effect on the $CaCO_3$ structure morphology compared to the pure structure.

Using $NH_4HCO_3$ in S5 resulted in a clear spherical crystal, mainly referred to as $CaCO_3$ formation and elongated rods, revealing the $NaHCO_3$ formation. It is important to note that the SEM analysis for S5 (FIG. 4(e)) indicates a higher purity structure compared to the solids recovered from S2 and S4, which can be explained by the reaction type. By referring to Equation (5) and (8), it is expected to have more chemical precipitation for more metal ions such as $Ca^{2+}$, $Na^+$, and $K^+$. While in S5, only soluble bicarbonate components were crystallized at higher concentrations resulting from the addition of the $NH_4HCO_3$ component.

Figure 4F:
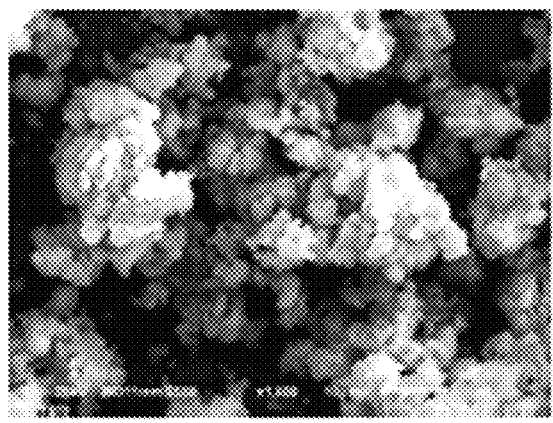
Figure 4F:
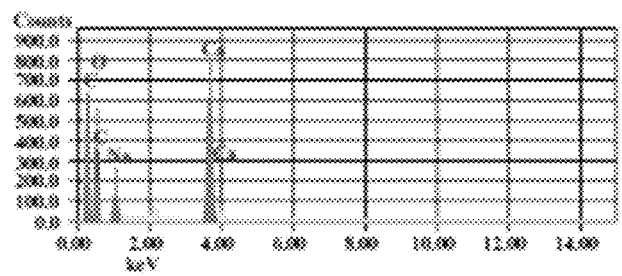

The SEM and EDS analyses results for S6 are presented in FIG. 4(f). The products are very similar to S4 but with a lower $NaHCO_3$ structure, where the spherical particles are dominant on both EDS spectrum and SEM captured image.

Figure 4G:
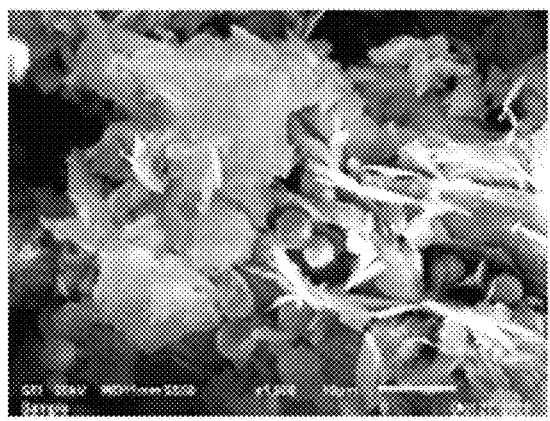
Figure 4G:
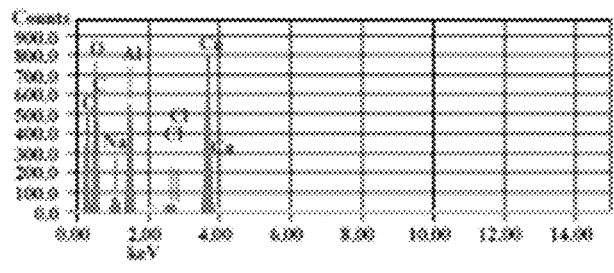

The EDS analysis for the solids collected from S7 (FIG. 4(g)) confirms the presence of $Cl^-$ and aluminum species beside Ca, Na, C, and O. The absence of the $SO_4^{2-}$ is related to the high recovery from the first electrocoagulation step. The presence of the coagulated Ca and Na components is expected based on Reaction (15). The presence of $Cl^-$ species could refer to the coagulation of the soluble $CaCl_2$ which formed based on Reaction (2) in the previous stage, and the presence of the coagulated $CaCl_2$ component was also confirmed by the XRD analysis demonstrated in Section 3.1. The SEM captured image for the solids collected in S7 shows three morphological structures: shells, plates, and many rhombic crystals. The shells and lamellar structure are most likely related to the $Al(OH)_3$. The clear rhombic structure could be related to the different complexes that formed based on Reaction (15) such as hydrocalumite and katotite. However, the hydrocalumite structure was not confirmed through the XRD analysis. Hydrocalumite and katotite components have a similar structure and morphological properties.

FTIR Analysis for the Collected Solids from the Multi-Stage Desalination Process.

Figure 5:
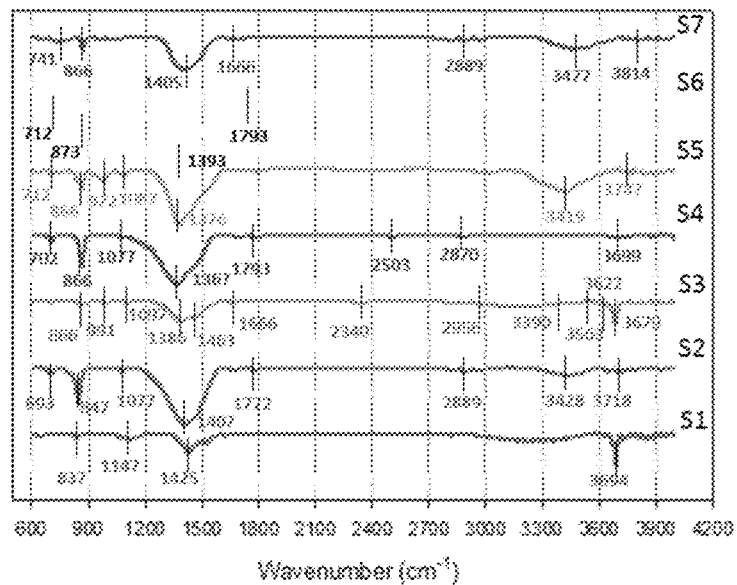
FIG. 5 is a line chart showing FTIR analysis of dried and collected solids from the first stage (S1), the second stage (S2), the third stage (S3), fourth stage (S4), fifth stage (S5), sixth stage (S6), and seventh stage (S7).

Spectra were acquired in the range of 500-4000 $cm^{-1}$ at a spectral resolution of 4 $cm^{-1}$ and using 34 scans. As shown in FIG. 5, many absorption bands with a clear difference among the collected solid samples were identified. In general, at wavenumbers of 3250-3750 $cm^{-1}$, peaks signifying the $OH^-$ group were observed. Peaks in the range of 2750-3000 $cm^{-1}$ representing C—H stretching were observed. An absorption band for carbonate group $CO_3^{-2}$ was detected at 1250-1750 $cm^{-1}$. A peak signifying the C—C group was also detected at the wavenumber range of 800-1200 $cm^{-1}$.

Specifically, the FTIR spectrum for the solids collected from S1 shows the most intensive peaks at wavenumbers of 3694, 1425, 1147 and 837 $cm^{-1}$, and these are very close to the detected wavenumbers for the pure $Mg(OH)_2$ at 3698, 1421, 1078 and 815 $cm^{-1}$, which indicates that the collected solids for the first stage are mainly high purity $Mg(OH)_2$.

FTIR spectral for S2 indicates mainly two groups of peaks. The first one includes 1772, 1407, 847 and 693 $cm^{-1}$ which refer to the $CaCO_3$ component that in its pure case have spectral peaks on 1790, 1393, 873 and 712 $cm^{-1}$. This deviation in the detected wavenumbers may be related to the presence of other components, which is the case for all the solids recovered from S2 to S7. $NaHCO_3$ products were also easily detected by peaks at the wavenumbers of 3718, 3428, 2889, and 1077 $cm^{-1}$, which is in good agreement with the ones in the pure state at 3741, 3433, 2855, and 1047 $cm^{-1}$.

In stage three, the peaks at wavenumbers of 1666, 1463, 1097, and 866 $cm^{-1}$ were related to $CaSO_4$, and the peaks at wavenumbers of 3622, 3563, 3390, and 991 $cm^{-1}$ were related to $Al(OH)_3$, and the peaks at wavenumbers of 3679, 2956, 2340, and 1386 $cm^{-1}$ were related to the complex $Ca_3Al_2(OH)_2$. These wavenumbers are in good agreement with the pure components as follows: 1625, 1447, 1134, and 875 $cm^{-1}$ for the $CaSO_4$, 3725, 3620, 3373, and 1016 $cm^{-1}$ for the $Al(OH)_3$, and 3662, 2947, 2321, and 1376 $cm^{-1}$ for the complex ($Ca_3Al_2(OH)_2$).

The spectra detected for solids of stage four are very close to the theoretical ones of $NaHCO_3$ and $CaCO_3$ as follows: wavenumbers of 3699, 2870, 2503, and 1077 $cm^{-1}$, which refer to the $NaHCO_3$ and of 1793, 1367, 866, and 693 $cm^{-1}$ which refer to $CaCO_3$. The differences in the spectral wavenumbers of stages two and four, even that same components are indicated ($NaHCO_3$ and $CaCO_3$) for both stages, confirm that the physical and structural properties are different, which was confirmed through both the XRD and SEM analysis. The same explanation is valid for the spectra recorded for the solids collected from stage five. Again, there is a deviation in the recorded wavenumbers that could be related to the physical properties of $CaCO_3$ and $NaHCO_3$ recovered from stages two, four and five.

In stage six, which is the second modified Solvay process, the FTIR analysis could not detect the presence of $NaHCO_3$, which may be related to the low concentration of the recovered component in this stage, while the following peaks indicated the $CaCO_3$ component on the wavenumbers of 1793, 1393, 873, 712 $cm^{-1}$.

Stage seven refers to the second electrocoagulation process. This stage is aimed mainly to reduce the concentration of the $Ca^{2+}$ and $Cl^-$ ions which were produced mainly from the first and the second modified Solvay process according to Reaction (17) and (18). Based on Equation (18), the $Cl^-$ ions are recovered as chlorine gas. However, both $Ca^{2+}$ and $Cl^-$ ions were detected in the EDS analysis, which indicated that some of $Cl^-$ ions are coagulated with the formed complex. The FTIR analysis for stage seven did not show a clear indication for the type of formed products, where overlapping between the intensive peaks which represent each component was noticed. The most intensive peaks at wavenumbers of 3477, 1405 and 866 $cm^{-1}$ may refer to $CaCl_2$), $Ca_3Al_2(OH)_2$, and $Al(OH)_3$, respectively. The most intensive peaks for each mentioned component in the pure state are at 1613, 1628, 2164, 3217, 3447, and 3489 $cm^{-1}$ for the $CaCl_2$), 1376, 2321, 2947, and 3662 $cm^{-1}$ for the $Ca_2Al_2(OH)_2$; 1016, 3373, 3725, and 3620 $cm^{-1}$ for $Al(OH)_3$.

Raman Analysis for the Collected Solids From the Multi-Stage Desalination Process Raman spectroscopy measurements were implemented to confirm the structure of the collected solids from each stage. Raman analysis, as shown in FIG. 6(a)-(g), shows a recorded intensity for the collected solid samples from stage one (a) to stage seven (g). The noticeable difference and deviation of the recorded intensity for each sample confirm the differences in the compositions and morphological characteristics. The Raman spectrum of the solid sample collected from stage one (FIG. 6(a)) provides additional confirmation for the presence of $Mg(OH)_2$ solids. The peaks are obtained at frequencies of 1092, 923, 881, 777, 448, and 279 $cm^{-1}$, which match the peaks observed in the Raman spectrum of $Mg(OH)_2$ reported in the literature as 1094, 915, 848, 519, 451, and 284 $cm^{-1}$.

Figure 6A:
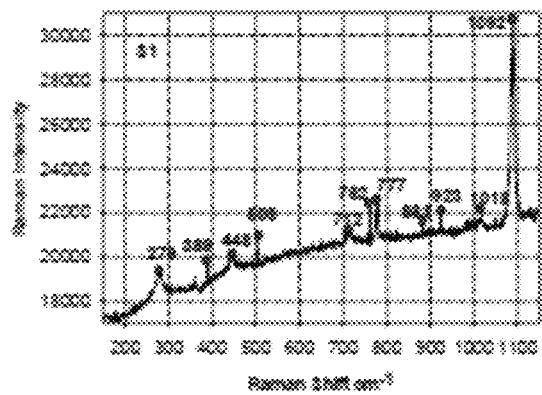
FIGS. 6(a)-(g) show Raman analysis of dried and collected solids from the first stage (S1), the second stage (S2), the third stage (S3), fourth stage (S4), fifth stage (S5), sixth stage (S6), and stage 7 (S7).
Figure 6B:
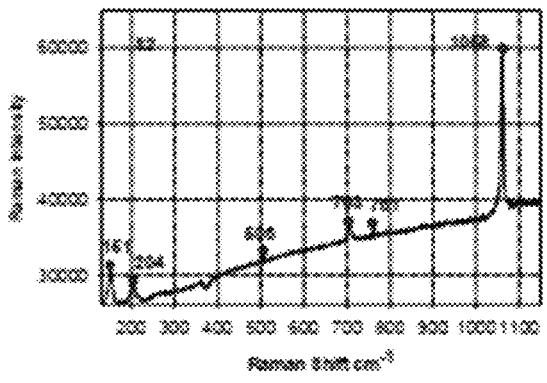

FIG. 6(b) shows the Raman analysis for the collected solids from stage two, which confirms the presence of $NaHCO_3$ as well as $CaCO_3$ with the obtained peaks at frequencies of 1058, 761, 703, 506, 204 and 151 $cm^{-1}$, which are in good agreement with the Raman analysis of the pure $NaHCO_3$ (1050, 680, 200, 220 and 180 $cm^{-1}$), and the pure calcium carbonate (1088, 712, 279, and 153 $cm^{-1}$). The expected overlapping in some of the most intensive peaks, such as (1058 cm$^{-1}$) for the two components, was detected in this analysis.

Figure 6C:
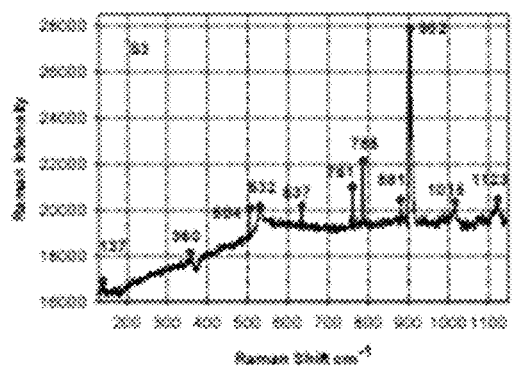

FIG. 6(c) illustrate the Raman spectrum recorded for the solids collected from stage three compared with the pure state of each expected component. The deviation from the frequency collected at a pure state is related to the presence of more than one component in the same solid sample.

Figure 6D:
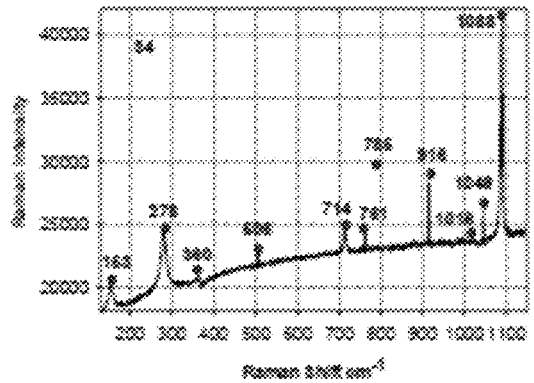
Figure 6E:
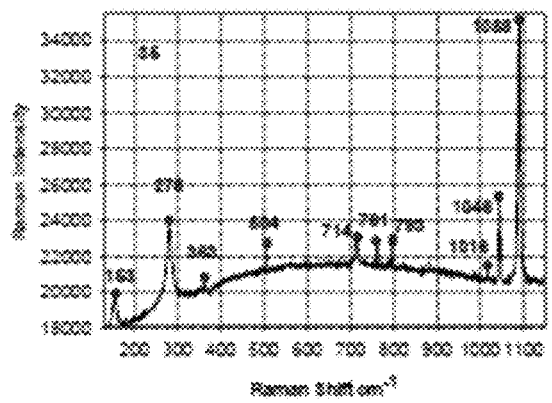
Figure 6F:
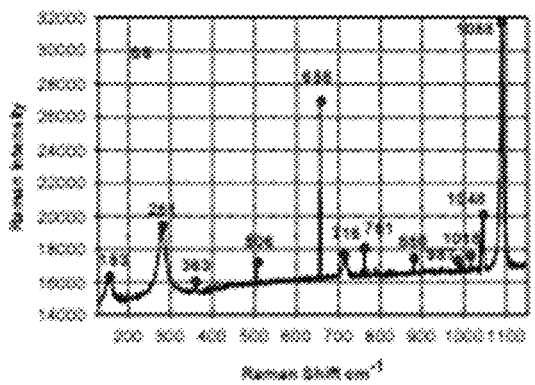

The collected solids from the fourth stage showed less overlapping among the most intensive peaks defining the pure $CaCO_3$ and $NaHCO_3$ than the solids collected from stage two, as demonstrated in FIG. 6(d). This indicates that the purity level of the collected solids from the modified Solvay process is higher than the solids collected from the traditional Solvay process. The solids collected from the sequential stages (4, 5 and 6) show similar findings to the results from SEM, XRD, and FTIR analyses, which confirms the presence of both $NaHCO_3$ and $CaCO_3$. However, some peaks at frequencies of 1016 and 916 in the case of the collected solids from stage four were recorded and may refer to other components that precipitated through the mentioned stage, and this relates to the presence of other ions in the brine such as $K^+$ but yet with lower concentration compared to $Na^+$ and $Ca^{2+}$ components.

Figure 6G:
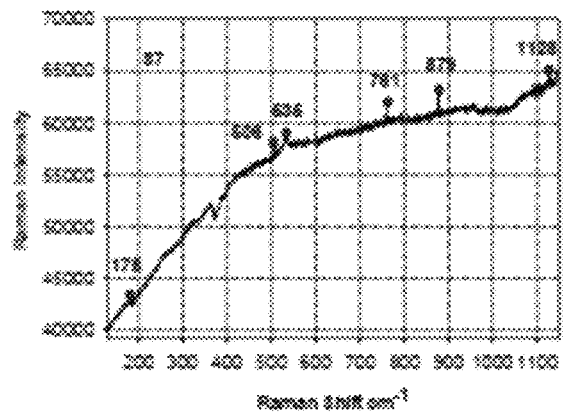

In the last stage (S7), the frequencies of the collected solids by Raman spectra are 1128, 879, 761, 535, 506, and 178 cm$^{-1}$, as shown in FIG. 6(g). These frequencies could be compared with the ones resulting from stage three (S3). It is clearly shown that fewer components with high purity are recovered from this stage. This is due to the absence of $SO_4^{2-}$ ions at this stage, as it was previously treated and recovered with a high percentage at the third stage. The presence of the $CaCl_2$ component was observed by comparing the frequencies at $CaCl_2$ in the pure state (1003, 850, 830, and 760 cm$^{-1}$) with the collected solids.

Brine Desalination Efficiency in Each Stage Based on the Multi-Stage Process

Figure 7:
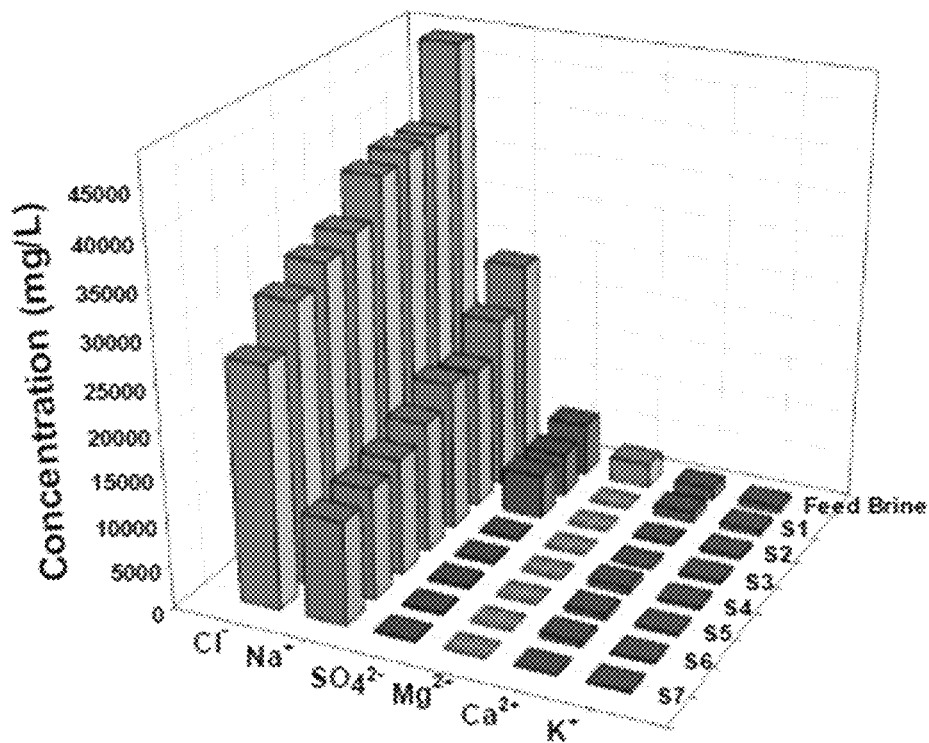
FIG. 7 is a bar chart showing ion concentrations in the fresh feed brine and effluent stream from S1 to S7.

The treated brine effluent from each stage was filtered and diluted to a proper concentration suitable for the ICP analysis. ICP was used to measure the concentration of $Na^+$, $Ca^{2+}$, $K^+$, and $Mg^{2+}$ ions. $Cl^-$ and $SO_4^{2-}$ ion concentrations measurements were conducted using the chloride ion-selective electrode (HACH Intellical™ ISECL181) and HACH spectrophotometer, respectively. Table 2 and FIG. 7 lists and shows, respectively, the real concentration of each ion in the brine effluent from each stage (S1 to S7), as well as the fresh feed brine. This was recorded based on the average reading of three different samples. For each stage, the reduction in ions concentration is calculated based on the difference between the concentration of ions in the specific stage effluent and feed brine according to Equation (23).

$$\text{Ion reduction \%} = \frac{Xi - Xf}{Xi} * 100 \quad (23)$$

where Xi denotes the initial concentration of ions in the fresh feed brine (mg/L), and Xf stands for the final concentration of ions in each stage (mg/L).

The effluent from S1 showed $Na^+$, $Ca^{2+}$, $K^+$, $Mg^{2+}$, $Cl^-$, and $SO_4^{2-}$ reduction of 17.84%, 16.47%, 17.78%, 99.99%, 17.81%, and 17.98%, respectively. It was confirmed that $Mg^{2+}$ is recovered from the first stage based on the SEM, FTIR, XRD, and Raman analysis. It is also important to note that reducing other ions is not related to any chemical reaction or precipitation into the solid phase. As expected, adding the $NH_3$ solution to the real brine sample with a specific molar ratio has affected the reduction of other ions due to the dilution effect since $NH_3$ is miscible with the brine. Accordingly, stage one resulted in total recovery for $Mg^{2+}$ only, and the reduction of other ions was due to the dilution effect.

S2, which represents the traditional Solvay process, was implemented to utilize the $NH_3$ as a buffer reagent for brine desalination and $CO_2$ capture. This stage resulted in $Na^+$, $Ca^{2+}$, $K^+$, $Cl^-$, and $SO_4^{2-}$ reduction of 32.97%, 87.48%, 58.57%, 17.77%, and 17.83%, respectively. This reduction is relative to the initial feed ions concentration. It can be concluded that the reductions of $Na^+$, $Ca^{2+}$, and $K^+$ ions are due to the effect of $NH_3$. While the $Cl^-$ and $SO_4^{2-}$ reductions are related to the dilution factor since the reduction removals from stages one and two are almost the same.

S3 (first electrocoagulation process) showed a further reduction in $Ca^{2+}$, reaching around 93%, which was expected based on the chemical reactions inside the EC cell. For $Na^+$ and $Ca^{2+}$, reductions were decreased to 29.43% and 56.4%, respectively. This is related to the recovery of $NH_3$ as $NH_3$ gas. In other words, the dilution effect of adding $NH_3$ in this step is reversed with a specific limit related to the ammonia concentration in the added ammonium hydroxide solution added in the first stage.

The most important effect of the first EC stage was the recovery of the $SO_4^{2-}$ ions in the form of $CaSO_4$ with total removal of 96.5% relative to the fresh feed brine. $Cl^-$ ions reduction was noticeable since the reduction reached up to 19.33%; however, the second EC process was expected to enhance the removal even more because of the recovery of some competing ions such as $SO_4^{2-}$ from the first EC process.

Even adding the CaO to the effluent brine of the S2 and feeding it to S3 resulted in treated brine that has a lower concentration of $Ca^{2+}$ compared to the feed brine, which confirms the ability of the EC unit to recover the $Ca^{2+}$ content from the brine effluent of the second stage unit.

The first modified Solvay process, S4, resulted in further $Na^+$, $K^+$, and $Cl^-$ reductions to reach approximately 37.98%, 61.51%, and 27.97%, respectively. As mentioned before, the low concentration of $K^+$ ions in the feed brine could be the reason for not detecting it in the solids analysis. It can be noticed that the reduction of $Cl^-$ slightly increased from 19.33% to 27.97%. Based on Reaction (2), it is expected to have $CaCl_2$ as one of the products, which is a soluble compound. The analysis showed that not all of the $Ca^{2+}$ converted to $CaCl_2$; however, some $Ca^{2+}$ ions converted to insoluble $CaCO_3$. Therefore, this low reduction of $Cl^-$ in

TABLE 2

| | Na (ppm) | Ca (ppm) | K (ppm) | Mg (ppm) | Cl (ppm) | SO$_4$ (ppm) | Salinity (asTDS NaCl) | |
|---|---|---|---|---|---|---|---|---|
| Feed Brine | 23,836 | 1,342 | 782 | 2,802 | 48,072 | 6,062 | 72,640 | 83,960 |
| Effluent of S7 | 11,668 | 86 | 163 | 0.0009 | 27,098 | 185 | 39,225 | 40,300 |
| Ions Recovery % | 43.11% | 92.55% | 75.8% | 99.9% | 34.5% | 96.45% | | | brine could be related to the precipitation of Cl⁻ as a result of its reaction with different soluble cations in the treated brine.

For S5, adding the $NH_4HCO_3$ had a significant effect for the Na and $Ca^{2+}$ ions reduction to reach around 44.39 and 55.14%, respectively. This was due to increasing the $HCO_3^-$ ions concentration, and hence decreasing the solubility of the $HCO_3^-$ products, which resulted in more participation of $NaHCO_3$ and $Ca(HCO_3)_2$ solids.

The second modified Solvay process, S6, has almost the same effect as the first modified Solvay process (S4). The $Na^+$, $Ca^{2+}$, $K^+$, and $Cl^-$ removals have been improved to 47.2%, 56.3%, 72.1% and 34.4%, respectively.

Since the effect of the first EC process on $Ca^{2+}$ reduction was noticeable (S3), the second EC process (S7) was conducted to enhance the overall calcium as well chloride reduction, especially after adding the calcium oxide to the previous stage (S6). S7 has a significant effect on $Ca^{2+}$ and $Cl^-$ reductions of 93.59% and 43.63%, respectively, which was also confirmed by the previous solid analysis for this specific stage. The $Na^+$ and $K^+$ percentage reductions were enhanced to be about 51% and 79%, respectively.

To avoid the effect of dilution in the first stage, the total ions recovery percentage was calculated by considering the additional ammonia volume to have more accurate representation on the multi-stage efficiency in the brine desalination. The following formula was used to find the ions recovery:

$$\text{Ions recovery \%} = \frac{Mi - Mf}{Mi} * 100 \quad (24)$$

where Mi denotes the initial mass of ions in the fresh feed brine (ppm), and Mf stands for the final mass of ions in each stage (ppm). Accordingly, the overall ions recovery percentage through seven stages of multi-stage desalination process for $Na^+$, $Ca^{2+}$, $K^+$, $Mg^{2+}$, $Cl^-$ and $SO_4^{2-}$ was found to be 43.11%, 92.55%, 75.80%, 99.90%, 34.50% and 96.45% respectively.

These results prove that the new invented multi-stage desalination process could have a significant effect on enhancing the desalination of the reject brine with high salinity and at the same time recover specific solids with specific cartelistic structures from every single stage. All the valuable solids that have been recovered from each stage (e.g., $NaHCO_3$, $CaCl_2$, $Mg(OH)_2$, and $CaCO_3$) can be reused in several industrial applications.

CO2 Capture by Multi-Stage Desalination Process

Figure 8A:
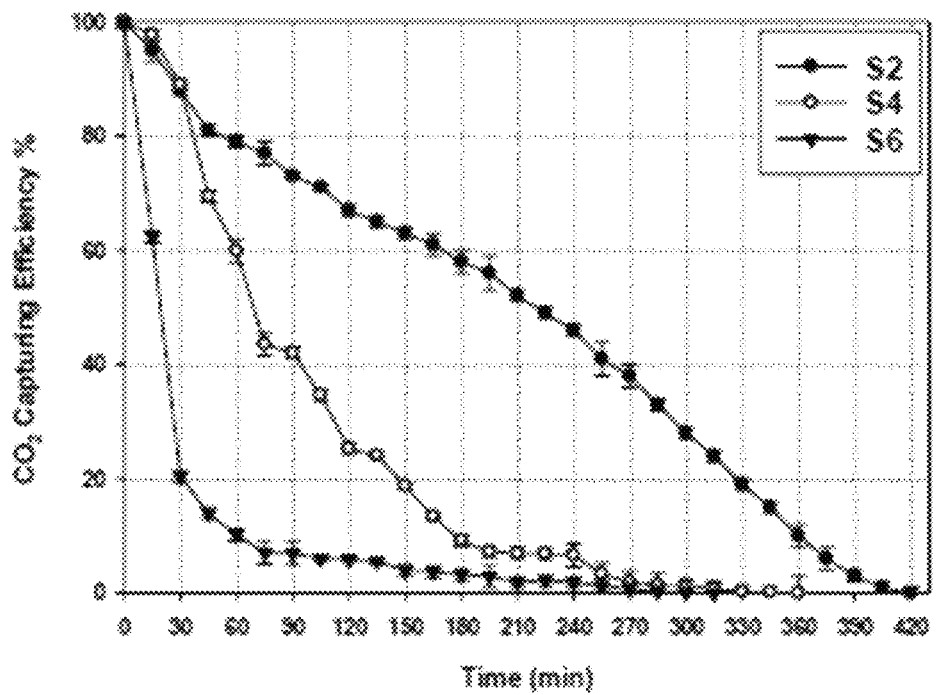
FIG. 8 shows (a) $CO_2$ capture efficiency; and (b) $CO_2$ uptake value for S2, S4, and S6.

Three stages from the invented multi-stage desalination process involve the reaction with the effluent gas (10% $CO_2$ and 90% air) to manage the reject brine and at the same time to enhance the efficiency of $CO_2$ gas capture. These stages are the traditional Solvay process (S2), first and second modified Solvay process (S4 and S6, respectively). FIG. 8(a) shows the $CO_2$ capture efficiency through the semi-batch mode for the three stages (batch for the treated brine and continuous for the gas mixture). The maximum $CO_2$ capture efficiency is for S2, followed by S4 and S6. This can be explained by reducing the ions concentration resulting from the second stage and accordingly decreasing the spontaneity of $CO_2$ capture in the following stages. As presented by Reaction (1) and (2), low $Na^+$ concentration shifts the carbonation reaction toward the reactant side, according to Le Chatelier's principle; this resulted in less $CO_2$ capture. The multi-stage process for $CO_2$ capturing proved that treating the effluent from a specific stage by different processes such as filtration, adding some chemicals, or electrochemical treatment enabled the same effluent to capture additional $CO_2$ in each stage.

Figure 8B:
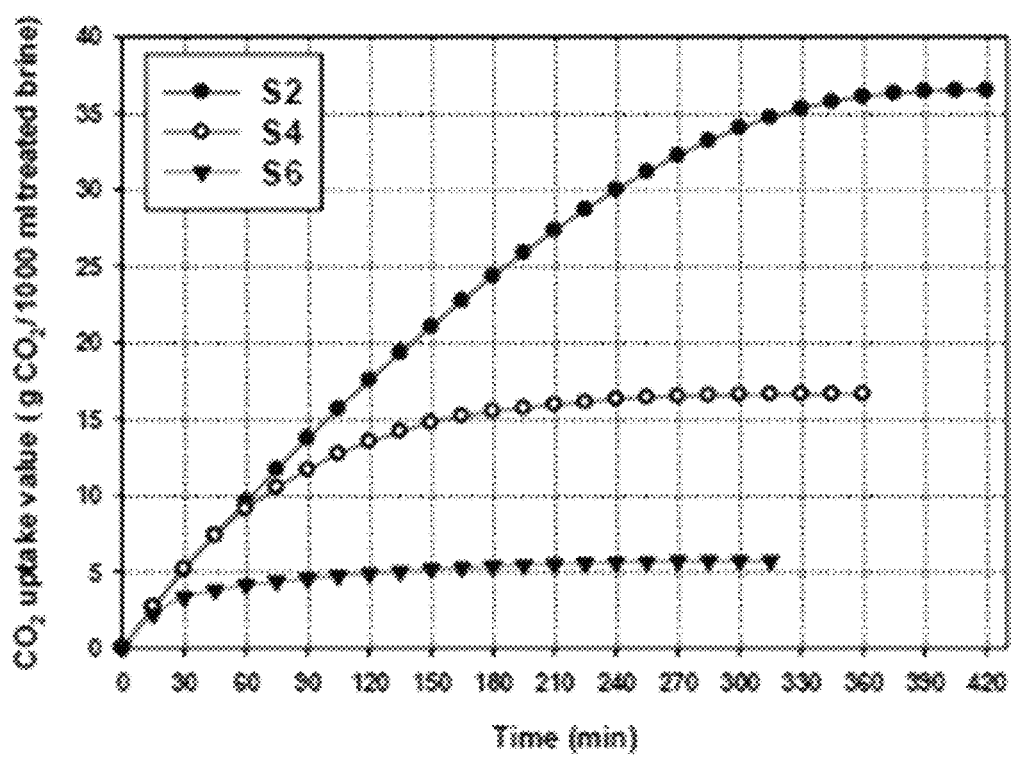

For example, as shown in FIG. 8(b), using a single-stage for traditional Solvay process could capture around 37 g of $CO_2$/1000 mL of treated brine. However, using the same treated brine for multi-stage desalination process achieved around $CO_2$ uptake of 17 g from S4 and another 6 g from S6. This resulted in about 60 g of $CO_2$/1000 mL of treated brine through the whole multi-stage desalination process, almost 81% improvement in the $CO_2$ uptake Based on these results, the present multistage desalination process could have a significant impact not only on recovering the salts content from the high salinity water but also for enhancing $CO_2$ capture efficiency and improving brine desalination. The recovered products such as magnesium hydroxide, sodium bicarbonate and calcium sulfate have significant industrial applications. The traditional and modified Solvay processes encounter a major challenge in the desalination efficiency and to produce a brine applicable in further agriculture or industrial applications. This challenge is connected to the existing competing reactions. In addition, the high solubility of the main product (sodium bicarbonate) is considered a major challenge for Solvay (traditional and modified) processes, and accordingly the low sodium removal recovery. The presently described subject matter shows certain sequences of the stages that can overcome this limitation in a way that improves the overall $CO_2$ uptake and enhances the desalination efficiency. In this regard, the order of the method steps described herein is selected to minimize competing reactions, thereby maximizing overall desalination and desalination efficiency.

It is to be understood that the multistage desalination process with carbon dioxide capture is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of desalinating brine with carbon dioxide capture, comprising the steps of:
   a. mixing a brine with an ammonia solution, whereby $NH_3$ in the ammonia reacts with magnesium carbonate ($MgCO_3$) in the brine to produce $NH_4HCO_3$ and magnesium hydroxide $Mg(OH)_2$ solids, with the magnesium hydroxide solids being precipitated from the brine and recovered via filtration, resulting in a first treated brine;
   b. reacting the first treated brine with a first $CO_2$-air gas mixture to produce first sodium bicarbonate ($NaHCO_3$) solids and ammonium chloride ($NH_4Cl$) and capture $CO_2$, with the first sodium bicarbonate solids being precipitated from the first treated brine and recovered via filtration, resulting in a second treated brine;
   c. reacting the second treated brine with first calcium oxide (CaO) to recover sulphate content from the second treated brine in the form of gypsum ($CaSO_4$) solids and to recover most remaining ammonia added in step a. as ammonium hydroxide, with the gypsum solids being precipitated from the second treated brine and recovered via filtration, resulting in a third treated brine;

d. reacting the third treated brine with second calcium oxide (CaO) and a second $CO_2$-air gas mixture to produce second sodium bicarbonate ($NaHCO_3$) solids and capture further $CO_2$, with the second sodium bicarbonate solids being precipitated from the third treated brine and recovered via filtration, resulting in a fourth treated brine;

e. reacting the fourth treated brine with ammonium bicarbonate ($NH_4HCO_3$) solids to decrease solubility of and thereby produce third sodium bicarbonate ($NaHCO_3$) solids, with the third sodium bicarbonate solids being precipitated from the fourth treated brine and recovered via filtration, resulting in a fifth treated brine;

f. reacting the fifth treated brine with third calcium oxide (CaO) and a third $CO_2$-air gas mixture to produce fourth sodium bicarbonate ($NaHCO_3$) solids and capture additional further $CO_2$, with the fourth sodium bicarbonate solids being precipitated from the fifth treated brine and recovered via filtration, resulting in a sixth treated brine; and g. recovering ammonium added in step e., calcium ions added in step f., and chloride ions from the sixth treated brine, with the ammonium mostly being recovered as $NH_3$ gas, the calcium and chloride ions being recovered as precipitated calcium hydroxide ($Ca(OH)_2$) solids, $Cl_2$ gas, and $CaCl_2$ solution, resulting in a desalinated brine.

2. The method of desalinating brine with carbon dioxide capture as recited in claim 1, wherein in step a, an excess amount of the ammonia in the form of an aqueous $NH_4OH$ solution is mixed with the brine to ensure complete recovery of magnesium and efficient $CO_2$ capture in further steps of the method.

3. The method of desalinating brine with carbon dioxide capture as recited in claim 1, wherein in step c, the recovered ammonia is recycled and reused in the method.

4. The method of desalinating brine with carbon dioxide capture as recited in claim 3, wherein, after completion of step c, about 80-85% of the ammonia added in step a. has been recovered.

5. The method of desalinating brine with carbon dioxide capture as recited in claim 1, wherein in step c, $SO_4^{2-}$ precipitation and $NH_3$ stripping occur in the presence of the first calcium oxide and using an electrical current.

6. The method of desalinating brine with carbon dioxide capture as recited in claim 1, wherein soluble ion concentration decreases in each successive treated brine.

7. The method of desalinating brine with carbon dioxide capture as recited in claim 1, wherein the order of method steps is used to minimize competing reactions, thereby maximizing overall desalination and desalination efficiency.

8. The method of desalinating brine with carbon dioxide capture as recited in claim 1, wherein the third treated brine used in step d. has an absence of magnesium and sulfates, thereby enhancing Na removal.

9. The method of desalinating brine with carbon dioxide capture as recited in claim 1, wherein total Na concentration is reduced in each successive treated brine.

10. The method of desalinating brine with carbon dioxide capture as recited in claim 1, wherein step b. is completed when concentration of captured $CO_2$ is equivalent to concentration of $CO_2$ added in the first $CO_2$-air gas mixture.

11. The method of desalinating brine with carbon dioxide capture as recited in claim 1, wherein the first treated brine has almost no Mg content.

12. The method of desalinating brine with carbon dioxide capture as recited in claim 1, wherein the third treated brine has almost no sulphate content.

13. The method of desalinating brine with carbon dioxide capture as recited in claim 1, wherein step g. further uses an electric current.

14. The method of desalinating brine with carbon dioxide capture as recited in claim 1, wherein step d. is conducted in the absence of magnesium and sulfates.

15. The method of desalinating brine with carbon dioxide capture as recited in claim 1, wherein overall reduction throughout the entire method for $Na^+$, $Ca^{2+}$, $K^+$, $Mg^{2+}$, $Cl^-$ and $SO_4^{2-}$ was found to be about 43.11%, 92.55%, 75.80%, 99.90%, 34.50%, and 96.45% respectively.

16. The method of desalinating brine with carbon dioxide capture as recited in claim 1, wherein overall $CO_2$ uptake for the method of desalinating brine resulted in about 60 g of $CO_2$/1000 mL of treated brine.

17. The method of desalinating brine with carbon dioxide capture as recited in claim 1, wherein step a. is conducted at a temperature of 20° C., a gas flow rate of 1.54 L/min, and a molar ratio of almost 3.3 moles $NH_3$ to 1 mole NaCl, resulting in a $CO_2$ capture efficiency of about 86% and $Na^+$ reduction of about 33%.

18. The method of desalinating brine with carbon dioxide capture as recited in claim 1, wherein the reaction of step c. occurs in a closed electrocoagulation cell.

19. The method of desalinating brine with carbon dioxide capture as recited in claim 1, wherein all recovered $NaHCO_3$, $CaCl_2$, $Mg(OH)_2$, and $CaCO_3$ can be reused in various industrial applications.

20. The method of desalinating brine with carbon dioxide capture as recited in claim 1, wherein, in step g., an electrocoagulation process is used recover the ammonium as $NH_3$ gas.

* * * * *